(12) United States Patent
Mandal et al.

(10) Patent No.: US 11,599,562 B2
(45) Date of Patent: Mar. 7, 2023

(54) SYSTEM AND A METHOD FOR RECOMMENDING FEATURE SETS FOR A PLURALITY OF EQUIPMENT TO A USER

(71) Applicant: Carrier Corporation, Palm Beach Gardens, FL (US)

(72) Inventors: Subhasis Mandal, Bangalore (IN); Arnab Biswas, Bangalore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 272 days.

(21) Appl. No.: 17/111,380

(22) Filed: Dec. 3, 2020

(65) Prior Publication Data

US 2021/0349919 A1 Nov. 11, 2021

(30) Foreign Application Priority Data

May 7, 2020 (IN) .............................. 202011019466

(51) Int. Cl.
  *G06F 7/00* (2006.01)
  *G06F 16/28* (2019.01)
  *G06F 16/23* (2019.01)
  *G06N 20/00* (2019.01)

(52) U.S. Cl.
  CPC ........ *G06F 16/285* (2019.01); *G06F 16/2365* (2019.01); *G06N 20/00* (2019.01)

(58) Field of Classification Search
  CPC .... G06F 16/285; G06F 16/2365; G06N 20/00
  USPC ................................................ 707/600–899
  See application file for complete search history.

(56) References Cited

U.S. PATENT DOCUMENTS

| 6,738,753 | B1 | 5/2004 | Hogan |
| 6,849,828 | B2 | 2/2005 | Aigner et al. |
| 8,947,437 | B2 | 2/2015 | Garr et al. |
| 9,239,830 | B2 | 1/2016 | Gopalakrishnan et al. |
| 9,475,359 | B2 | 10/2016 | Mackay |
| 9,576,262 | B2 * | 2/2017 | Ganguly .............. G06Q 10/067 |
| 10,109,122 | B2 | 10/2018 | Farahat et al. |
| 10,234,853 | B2 | 3/2019 | Mukkamala et al. |
| 10,409,926 | B2 | 9/2019 | Mehta et al. |
| 10,530,666 | B2 | 1/2020 | Venkitapathi et al. |
| 2015/0120359 | A1 | 4/2015 | Dongieux |

FOREIGN PATENT DOCUMENTS

| CN | 108460144 A | 8/2018 |
| WO | 2019051615 A1 | 3/2019 |
| WO | 2019070290 A1 | 4/2019 |
| WO | 2019231466 A1 | 12/2019 |

* cited by examiner

*Primary Examiner* — Isaac M Woo
(74) *Attorney, Agent, or Firm* — Cantor Colburn LLP

(57) ABSTRACT

A system and a method for recommending feature sets for a plurality of equipment to a user. The method includes creating a library of contextual and preprocessed feature sets in a hierarchical manner for recommending features sets to a user. The method also includes compiling a plurality of hierarchical feature sets with a last feature set in a hierarchy being generated using an output of a module and incrementally adding the generated feature sets using different modules to the feature sets generated by the module. The method includes validating the generated feature sets to remove errors and using the validated feature sets as labelled data for previous feature sets and using attributes to categorize the labelled data corresponding to the contextual and pre-processed feature sets.

20 Claims, 8 Drawing Sheets

SYSTEM AND A METHOD FOR RECOMMENDING FEATURE SETS FOR A PLURALITY OF EQUIPMENT TO A USER

CROSS-REFERENCE TO RELATED APPLICATIONS

This application claims priority to Indian Patent Application No. 202011019466, filed May 7, 2020, the contents of which are incorporated by reference herein in their entirety.

TECHNICAL FIELD OF INVENTION

The present invention generally relates to IOT (Internet of Things) solutions for managing equipment and buildings. More particularly, the invention relates to a system and a method for recommending feature sets to a user for a plurality of equipment located in a building/site.

BACKGROUND OF THE INVENTION

Sites both residential and commercial have a plurality of equipment. Such equipment offer similar services but are manufactured by different manufacturers, have different models and sizes. The equipment also have different performance criteria like availability, compliance, health, efficiency etc. which may be overlapping and inter-dependent. To improve individual performance objectives, different models are required which need to be normalized for other objectives, to provide accurate and isolated service actionables. To achieve these objectives, multiple artificial intelligence/machine learning (AI/ML) models are required for using components of other models. Additionally, the cost of creating a labelled dataset for any model is very high. In a typical AI/ML platform, a user needs to manually identify the right set of inputs and select an optimal AI/ML algorithm available in the system to solve a particular problem. The creation of AI models from raw data to the final objective of the service actionables in different categories is complex and has huge processing requirements. Also, selecting the right variables as features, developing field tests and using these tests to achieve the target objectives of the model is very time consuming. Further, the identification of a right AI/ML algorithm and input/s are time as well as resource consuming and also requires deep domain knowledge and expertise. Resolution of a problem or an optimized output is thus constrained based on limited knowledge of the user and requires multiple iterations and experimentation.

In view of the afore-mentioned problems in the existing solutions, there is a need of an effective system and a method for developing a cost-effective AL/ML model to recommend feature sets to a user. There is also a requirement for a system and a method for reducing the need of experimentation for developing the AL/ML model. In order to solve the problems in the existing solutions, a system and a method are disclosed.

SUMMARY OF THE INVENTION

Various embodiments of the invention describe a system for recommendation and reengineering of feature sets and labelled data for an equipment. The system comprises a feature set library and recommendation engine, a feature set creation module, a validation module and a labelling module. The feature set library and recommendation engine is configured to create a library of contextual and preprocessed feature sets in a hierarchical manner. The feature set library and recommendation engine is also configured to recommend features from generated feature sets to a user based on a problem statement/hypothesis to be solved as defined by the user. The feature set creation module is configured to compile a plurality of hierarchical feature sets with a last feature set in a hierarchy being generated using an output of a service actionable (SACT) module. The feature set creation module is further configured to incrementally add the generated feature sets using an output of an insight indices generation module, a classification module and a characterization module to the feature sets generated by the SACT module. The validation module is configured to validate the generated feature sets to remove errors present in the generated feature sets. The labelling module is configured to use the validated feature sets as labelled data for previous feature sets in the hierarchy of processing and using a plurality of pre-defined and user configurable attributes to categorize the labelled data corresponding to the contextual and pre-processed feature sets.

In an embodiment of the invention, the recommended feature sets and the labelled data for the equipment are used by Artificial Intelligence (AI), Machine Learning (ML), Auto-AI platforms using a library of reusable, modelled, hierarchical features.

In another embodiment of the invention, the feature set library and recommendation engine is further configured to provide the feature set recommendations to the user in form of a plurality of categories using one or more dimensions, wherein the plurality of categories comprise technology category and problem and performance category, wherein the one or more dimensions comprise component process technology similarity between different equipment, problem type and hierarchical and enriched pre-processed feature set by degrees of processing, and wherein the problem type comprises failure prediction, best operation setting forecast and operation settings optimization.

In yet another embodiment of the invention, the generated feature sets comprise a plurality of numerical and categorical feature sets.

In an embodiment of the invention, the system is configured to use higher level features in the hierarchy in each of the generated feature set as weak labels for achieving SACT objectives in case when ground truth labels corresponding to an objective are not available at all or are available only for a subset of instances. Also, the system is further configured to use weak labels from different hierarchies of the generated feature sets to predict unseen ground truth labels. The weak labels are labels which are confirmed by automation only and the ground truth labels are labels which are confirmed through actual successful implementation of recommendation by a technician.

In a different embodiment of the invention, the user is enabled to interact with the system using a well-defined interface. Further, the interface enables the user to define the problem statement/hypothesis to be solved in a particular equipment category and specify an error margin and a resource limit for the problem statement/hypothesis to be solved. The interface also enables the user to receive the generated hierarchical feature set recommendations from the feature set library and recommendation engine based on the defined hypothesis. The interface further enables the user to select features from the hierarchy of received feature sets for further processing, configure a number of iterations with incremental feature sets until an objective is achieved for the defined hypothesis and configure ground truth labels corresponding to the objective or select higher level features in the hierarchy in each generated feature set as weak labels in case of absence of ground truth labels. The system is configured to create a matrix based on the selected feature set recommendations, the ground truth labels or the weak labels and user selections of the hypothesis with the error margin for feeding into an AI/ML supervised algorithm(s) to run a process in an iterative manner for solving the particular hypothesis within the specified resource limit. Also, the feature sets are recommended to the user for running the iterations until the recommendations are within the specified error margin or when the specified resource limit is reached. The system is configured to recommend the user to use higher order related features in hierarchy to achieve recommendations within the specified error margin when the specified resource limit is reached.

In another embodiment of the invention, the system is configured to use pre-configured number of iterations and to automatically select features from the hierarchy of the received feature sets from the feature set library and recommendation engine based on the hypothesis for further processing thereby making the system completely autonomous to generate the feature set recommendations within specified error margin.

In yet another embodiment of the invention, the system is configured to provide the user with an option to select a previously solved objective or define a new objective corresponding to an equipment as a hypothesis in a particular equipment category and select the technology category to use the hierarchical feature sets available from the feature set library and recommendation engine associated with the technology category for same or similar equipment using a similar technology for an operation. The system is also configured to provide the user with an option to select the problem type to use the hierarchical feature sets available from the feature set library and recommendation engine associated with the problem type categories for the same or similar equipment with a similar type of the operation or failures and use additional hierarchy of available related feature sets incrementally in case the user defined objectives are not achieved.

In another embodiment of the invention, the output from the characterization module is a numerical feature set of characterized data that addresses a plurality of variances owing to differences in technology, frequency, asynchronicity, data stream interruptions, make and model in data stream received from the equipment by uniformly characterizing equipment type reusable by other systems to determine equipment behavior.

In yet another embodiment of the invention, the output from the classification module is a categorical feature set of time granular normalized characteristics after behaviorally classifying and profiling the equipment under different categories at individual time intervals to proactively resolve behaviors associated with the equipment which can otherwise lead to a failure or inefficient operations.

In still another embodiment of the invention, the output from the insight indices generation module is a numerical and categorical feature set of insight indicators at a time granular level independent of plurality of characteristics and behavior for the equipment after normalizing variances of characteristics and behavior over a time duration.

In a different embodiment of the invention, the output from the service actionable module is a categorical feature set of service actionable which can be integrated into workflows obtained after categorizing, hierarchically correlating and aggregating insight indices over a period of its result state.

In a different embodiment of the invention, the feature set creation module is configured to handle missing values and duplicate instances in data received from the characterization module, the classification module, the insight indices generation module and the service actionable (SACT) module. The missing values are handled by categorizing results to identify missing and incomplete information as separate result states to produce cleaned dataset readily usable by AI/ML platforms. The duplicate instances are handled by reusing the each generated feature set along the hierarchy to avoid any reprocessing that may result in duplication. Also, the system is configured to version each feature set generated along with a timestamp to enable feature provenance.

In another embodiment of the invention, the system is configured to create/publish new feature sets using simple configuration files stating an input data source and extraction logic (metadata). And, the system is further configured to enable the user to request backfilling of values of new feature sets for historical data enabling additional historical data sets for use by AI/ML platforms.

In an embodiment of the invention, the generated feature sets comprise a plurality of simple canonical names directly available for consumption by the AI/ML platform to make the usage of the recommendations from the feature set library and recommendation engine intuitive and easy.

In a different embodiment of the invention, the system is configured to convert actions in a field and confirmation of the actions into labels which are directly fed back to the feature set library and recommendation engine for use without any additional processing.

Various embodiments of the invention describe a method for recommendation and reengineering of feature sets and labelled data for an equipment. The method comprises steps of creating, by a feature set library and recommendation engine, a library of contextual and preprocessed feature sets in a hierarchical manner and for recommending features from generated feature sets to a user based on a problem statement/hypothesis to be solved as defined by the user. The method also comprises steps of compiling, by a feature set creation module, a plurality of hierarchical feature sets with a last feature set in a hierarchy being generated using an output of a service actionable (SACT) module. The feature set creation module incrementally adds the generated feature sets using an output of an insight indices generation module, a classification module and a characterization module to the feature sets generated by the SACT module. The method further comprises steps of validating the generated feature sets to remove errors present in the generated feature sets and using the validated feature sets as labelled data for previous feature sets in the hierarchy of processing and using a plurality of pre-defined and user configurable attributes to categorize the labelled data corresponding to the contextual and pre-processed feature sets.

In an embodiment of the invention, the recommended feature sets and the labelled data for the equipment are used by Artificial Intelligence (AI), Machine Learning (ML), Auto-AI platforms using a library of reusable, modelled, hierarchical features.

In another embodiment of the invention, the feature set library and recommendation engine is further configured to provide the feature set recommendations to the user in form of a plurality of categories using one or more dimensions, wherein the plurality of categories comprise technology category and problem and performance category, wherein the one or more dimensions comprise component process technology similarity between different equipment, problem type and hierarchical and enriched pre-processed feature set by degrees of processing, and wherein the problem type comprises failure prediction, best operation setting forecast and operation settings optimization.

In yet another embodiment of the invention, the generated feature sets comprise a plurality of numerical and categorical feature sets.

In an embodiment of the invention, higher level features are used in the hierarchy in each of the generated feature set as weak labels for achieving SACT objectives in case when ground truth labels corresponding to an objective are not available at all or are available only for a subset of instances. Also, weak labels are used from different hierarchies of the generated feature sets to predict unseen ground truth labels. The weak labels are labels which are confirmed by automation only and the ground truth labels are labels which are confirmed through actual successful implementation of recommendation by a technician.

In a different embodiment of the invention, the user interacts with a system using a well-defined interface. Further, the interface enables the user to define the problem statement/hypothesis to be solved in a particular equipment category and specify an error margin and a resource limit for the problem statement/hypothesis to be solved. The interface also enables the user to receive the generated hierarchical feature set recommendations from the feature set library and recommendation engine based on the defined hypothesis. The interface further enables the user to select features from the hierarchy of received feature sets for further processing, configure a number of iterations with incremental feature sets until an objective is achieved for the defined hypothesis and configure ground truth labels corresponding to the objective or select higher level features in the hierarchy in each of the generated feature set as weak labels in case of absence of ground truth labels. The system creates a matrix based on the selected feature set recommendations, the ground truth labels or the weak labels and user selections of hypothesis with error margin for feeding into an AI/ML supervised algorithm(s) to run a process in an iterative manner for solving the particular hypothesis within the specified resource limit. Also, the feature sets are recommended to the user for running the iterations until the recommendations are within the specified error margin or when the specified resource limit is reached. The system is configured to recommend the user to use higher order related features in hierarchy to achieve recommendations within the specified error margin when the specified resource limit is reached.

In another embodiment of the invention, pre-configured number of iterations are used and automatically features are selected from the hierarchy of the received feature sets from the feature set library and recommendation engine based on the hypothesis for further processing thereby making the system completely autonomous to generate the feature set recommendations within specified error margin.

In yet another embodiment of the invention, the user is provided with an option to select a previously solved objective or define a new objective corresponding to an equipment as a hypothesis in a particular equipment category and select the technology category to use the hierarchical feature sets available from the feature set library and recommendation engine associated with the technology category for same or similar equipment using a similar technology for an operation. The user is provided with an option to select the problem type to use the hierarchical feature sets available from the feature set library and recommendation engine associated with the problem type categories for the same or similar equipment with a similar type of the operation or failures and use additional hierarchy of available related feature sets incrementally in case the user defined objectives are not achieved.

In another embodiment of the invention, the output from the characterization module is a numerical feature set of characterized data that addresses a plurality of variances owing to differences in technology, frequency, asynchronicity, data stream interruptions, make and model in data stream received from the equipment by uniformly characterizing equipment type reusable by other systems to determine equipment behavior.

In yet another embodiment of the invention, the output from the classification module is a categorical feature set of time granular normalized characteristics after behaviorally classifying and profiling the equipment under different categories at individual time intervals to proactively resolve behaviors associated with the equipment which can otherwise lead to a failure or inefficient operations.

In still another embodiment of the invention, the output from the insight indices generation module is a numerical and categorical feature set of insight indicators at a time granular level independent of plurality of characteristics and behavior for the equipment after normalizing variances of characteristics and behavior over a time duration.

In a different embodiment of the invention, the output from the service actionable module is a categorical feature set of service actionable which can be integrated into workflows obtained after categorizing, hierarchically correlating and aggregating insight indices over a period of its result state.

In a different embodiment of the invention, the feature set creation module handles missing values and duplicate instances in data received from the characterization module, the classification module, the insight indices generation module and the service actionable (SACT) module. The missing values are handled by categorizing results to identify missing and incomplete information as separate result states to produce cleaned dataset readily usable by AI/ML platforms. The duplicate instances are handled by reusing the each generated feature set along the hierarchy to avoid any reprocessing that may result in duplication. Also, the system is configured to version each feature set generated along with a timestamp to enable feature provenance.

In another embodiment of the invention, new feature sets are created/published using simple configuration files stating an input data source and extraction logic (metadata). And, the user is enabled to request backfilling of values of new feature sets for historical data enabling additional historical data sets for use by AI/ML platforms.

In an embodiment of the invention, the generated feature sets comprise a plurality of simple canonical names directly available for consumption by the AI/ML platform to make the usage of the recommendations from the feature set library and recommendation engine intuitive and easy.

In a different embodiment of the invention, actions in a field are converted and confirmation of the actions into labels which are directly fed back to the feature set library and recommendation engine for use without any additional processing.

In another different embodiment of the invention, a computer readable medium is disclosed for recommendation and reengineering of feature sets and labelled data for an equipment. The computer readable medium comprises one or more processors and a memory is coupled to the one or more processors, the memory stores instructions executed by the one or more processors. The one or more processors are configured to create, by a feature set library and recommendation engine, a library of contextual and preprocessed feature sets in a hierarchical manner and for recommending features from generated feature sets to a user based on a problem statement/hypothesis to be solved as defined by the user. The one or more processors are configured to compile, by a feature set creation module, a plurality of hierarchical feature sets with a last feature set in a hierarchy being generated using an output of a service actionable (SACT) module. The feature set creation module incrementally adds the generated feature sets using an output of an insight indices generation module, a classification module and a characterization module to the feature sets generated by the SACT module. The one or more processors are configured to validate the generated feature sets to remove errors present in the generated feature sets and using the validated feature sets as labelled data for previous feature sets in the hierarchy of processing and to use a plurality of pre-defined and user configurable attributes to categorize the labelled data corresponding to the contextual and pre-processed feature sets.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

FIGS. 4A-4G depict screenshots of an interface of a system showing a "Problem Definition" tab to define a problem statement, a "Configuration" tab to configure and a "Result" tab for outputting final output of the system.

Corresponding reference numerals indicate corresponding parts throughout the drawings.

DETAILED DESCRIPTION OF THE INVENTION

Figure 1:
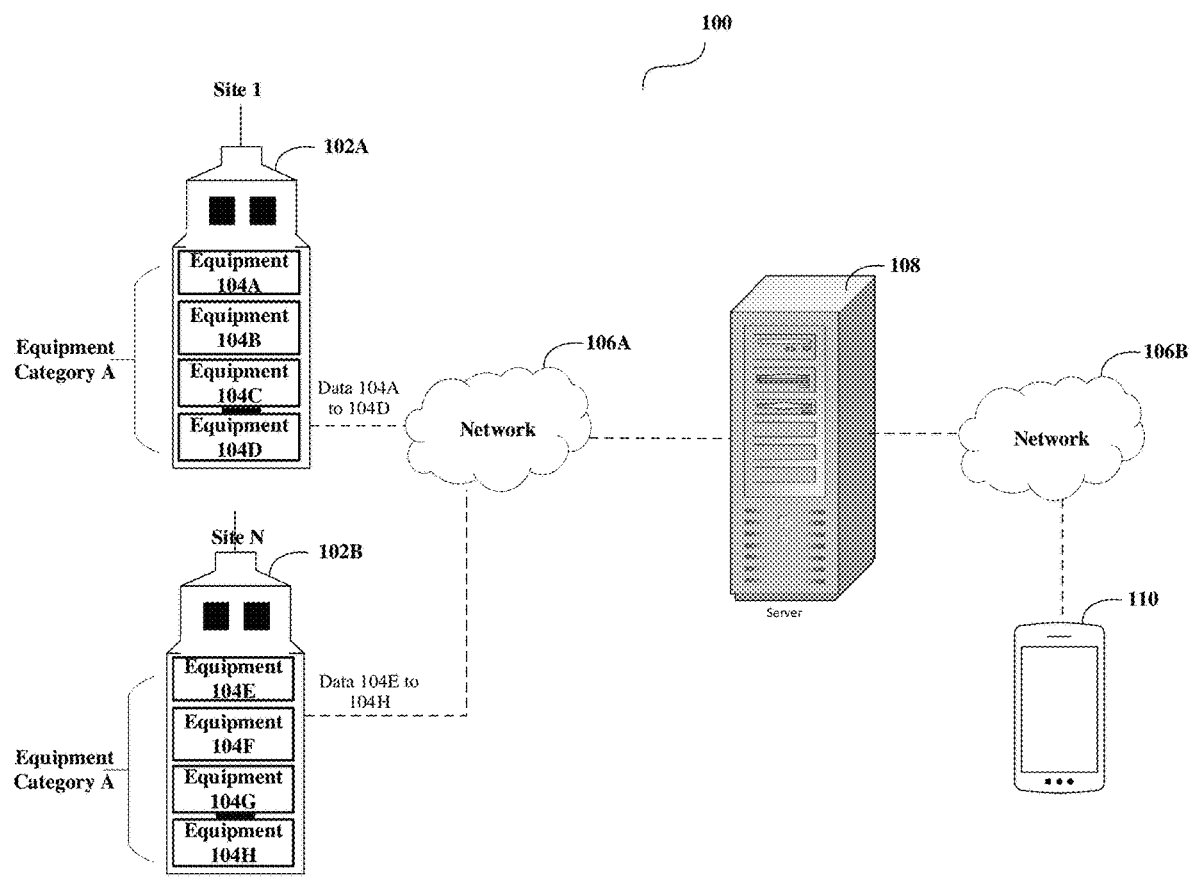
FIG. 1 depicts an exemplary system architecture according to an exemplary embodiment of the invention.

Described herein is the technology with a system and a method for recommendation and reengineering of feature sets and labelled data for an equipment. One or more buildings/sites may have a plurality of equipment present inside or outside the site. Each of these plurality of equipment may also have the capability to transmit data stream to a server through a network. The server may generate features sets for each of characteristics or characterized data, time-granular normalized characteristics, time-granular insight indicators and service actionable for the plurality of equipment from the data stream. Also, the feature set of the time-granular insight indicators may be an output of an insight indices generation module and the feature set of the time-granular normalized characteristics may be an output of a classification module. Further, the feature set of the characteristics/characterized data may be an output of a characterization module and the feature set of the service actionable may be an output of a service actionable (SACT) module. The features sets for each of the characteristics/characterized data, time-granular normalized characteristics, time-granular insight indicators and service actionable for the plurality of equipment may be provided as an input to a system.

The system may create a library of the contextual and preprocessed feature sets in a hierarchical manner to recommend features from generated feature sets to a user based on a problem statement/hypothesis to be solved as defined by the user. The system may also compile a plurality of hierarchical feature sets with a last feature set in a hierarchy. The plurality of hierarchical feature sets being generated may be complied using an output of the SACT module. And also incrementally adding the generated feature sets using an output of the insight indices generation module, the classification module and the characterization module to the feature sets generated by the SACT module. Moreover, the system may validate the generated feature sets to remove errors present. Then, the system may use the validated feature sets as labelled data for previous feature sets in the hierarchy and categorize the labelled data corresponding to the contextual and pre-processed feature sets using a plurality of attributes.

As used herein, the plurality of equipment may have capability to generate data stream as described below. Each of the plurality of equipment may be connected with the server through the network and transmit the data stream to the server. Such plurality of equipment may be refrigerators, air conditioners, heating, ventilation, and air conditioning (HVAC) systems, chillers, televisions, geysers, lights, laptop, computers, mobile devices, wearable devices, fans, cameras or any such equipment that is well known in the art.

As used herein, the server has processing capabilities as disclosed further in the specification. The server may be a cloud storage, a remote database, or any such storage known in the art.

As used herein, the network may refer to a wired network, a mesh network, a cellular network such as Global System for Mobile (GSM) network, a Long-Term Evolution (LTE) network, a code-division multiple access (CDMA) network, a narrow-band internet of thing (NB-IoT) technique or category M1 technique or any such network/technique that is known in the art.

Throughout the specification, reference numeral 102 depicts all sites. Each of the reference numerals 102A-102B may be considered as a separate site. Also, throughout the specification, reference numeral 104 depicts all equipment. Each of the reference numerals 104A-104H may be considered as a separate equipment.

FIG. 1 depicts an exemplary system architecture 100 according to an exemplary embodiment of the invention. As can be seen in FIG. 1, a site 102A may have a plurality of equipment (i.e. four equipment), namely 104A, 104B, 104C and 104D. Similarly, another site 102B may also have other four equipment, namely 104E, 104F, 104G and 104H. These equipment 104 may be located inside or outside the site 102. Further, each of these plurality of equipment 104 may determine data stream and may transmit the data stream to a server 108 through a network 106A. When the server 108 receives the data stream from each of the plurality of equipment 104, the server 108 may generate characteristics or characterized data and feature sets for the characterized data for each of the plurality of equipment 104 using methodology as described in Indian Application No. 202011019422 Titled "A System And A Method For Uniformly Characterizing Equipment Category" which is incorporated herein by reference. The server 108 may also generate feature sets for each of time-granular normalized characteristics, time-granular insight indicators and service actionables using methodology as described in Indian Application No. 202011019451 Titled "A System And A Method For Generating Service Actionable For Equipment" which is incorporated herein by reference. The feature sets for each of the characteristics or characterized data, the time-granular normalized characteristics, the time-granular insight indicators and the service actionable for the plurality of equipment 104 may be provided as inputs in a system 200 which is explained below. The server 108 may transmit output/s of the system 200 to a device 110 through a network 106B, wherein the device 110 may exhibit such output/s. Further, a user may access the system 200 using the device 110.

Figure 2:
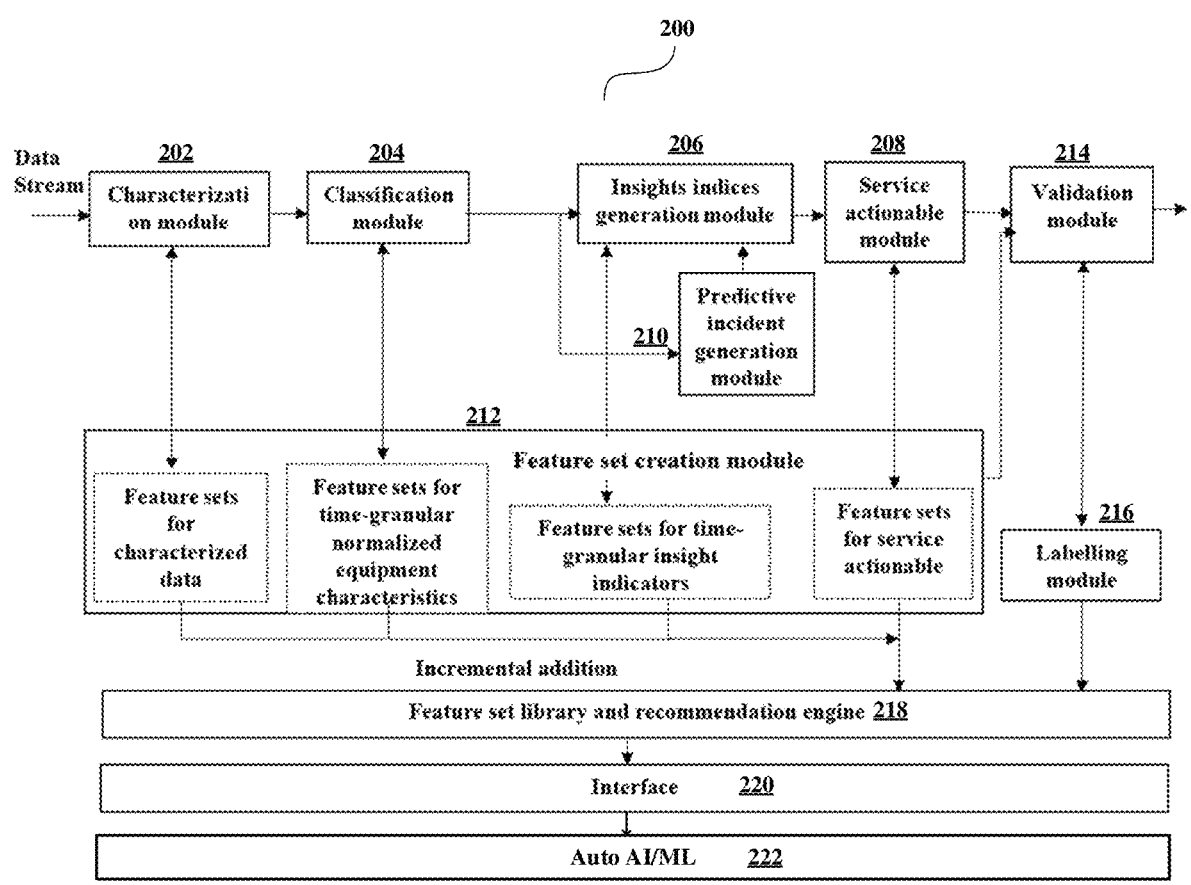
FIG. 2 depicts a block diagram of different components of an exemplary system for recommending feature sets to a user according to an exemplary embodiment of the invention.

FIG. 2 depicts a block diagram of different components of an exemplary system 200 of the server 108 according to an exemplary embodiment of the invention. The system 200 may comprise of, but is not limited to, a characterization module 202, a classification module 204, an insights indices generation module 206, a service actionable module 208, a predictive incident generation module 210, a feature set creation module 212, a validation module 214, a labelling module 216, a feature set library and recommendation engine 218, an interface 220 and an auto artificial intelligence/machine learning (AI/ML) model 222. The characterization module 202 may be configured to generate characteristics/characterized data and feature sets for the characterized data for each of the plurality of equipment 104 using methodology as described in Indian Application No. 202011019422 Titled "A System And A Method For Uniformly Characterizing Equipment Category" which is incorporated herein by reference. In an exemplary embodiment, the output received from the characterization module 202 is a numerical feature set of characterized data that addresses a plurality of variances owing to differences in technology, frequency, asynchronicity, data stream interruptions, make and model in data stream received from the equipment 104 by uniformly characterizing equipment type reusable by other systems to determine equipment behavior.

The classification module 204 may be configured to generate time-granular normalized characteristics and feature sets for the time-granular normalized characteristics for each of the plurality of equipment 104 using methodology as described in Indian Application No. 202011019451 Titled "A System And A Method For Generating Service Actionable For Equipment" which is incorporated herein by reference. In an exemplary embodiment, the output received from the classification module 204 is a categorical feature set of time granular normalized characteristics after behaviorally classifying and profiling the equipment 104 under different categories at individual time intervals to proactively resolve behaviors associated with the equipment 104 of the sites 102 which can otherwise lead to a failure or inefficient operations.

The insights indices generation module 206 may be configured to generate time-granular insight indicators and feature sets for the time-granular insight indicators for each of the plurality of equipment 104 using methodology as described in Indian Application No. 202011019451 Titled "A System And A Method For Generating Service Actionable For Equipment" which is incorporated herein by reference. In an exemplary embodiment, the output received from the insight indices generation module 206 is a numerical and categorical feature set of insight indicators at a time granular level independent of plurality of characteristics and behavior for the equipment 104 after normalizing variances of equipment characteristics and behavior over a time duration.

The service actionable module 208 may be configured to generate service actionable and feature sets for the service actionable for each of the plurality of equipment 104 and the predictive incident generation module 210 may predict actions/insights using methodology as described in Indian Application No. 202011019451 Titled "A System And A Method For Generating Service Actionable For Equipment" which is incorporated herein by reference. In an exemplary embodiment, the output received from the service actionable module 208 is a categorical feature set of service actionable which can be integrated into workflows obtained after categorizing, hierarchically correlating and aggregating the generated insight indices over a period of its result state.

The feature set creation module 212 may be configured to receive outputs (i.e. the feature sets) for each of the characteristics or characterized data from the characterization module 202, the feature sets for the time-granular normalized characteristics from the classification module 204, the feature sets for the time-granular insight indicators from the insights indices generation module 206 and the feature sets for the service actionable from the service actionable module 208 for each of the plurality of equipment 104. In an exemplary embodiment, the feature sets may comprise numerical feature sets and/or categorical feature sets. The feature set creation module 212 may be configured to compile a plurality of hierarchical feature sets with a last feature set in a hierarchy being generated using an output of the service actionable (SACT) module 208. The feature set creation module 212 may be further configured to incrementally add the generated feature sets using an output of the insight indices generation module 206, the classification module 204 and the characterization module 202 to the feature sets generated by the SACT module 208. Moreover, the feature set creation module 212 may hierarchically compile the feature sets. The hierarchical compilation of the feature sets may be used to further fine tune the system 200 at each step of hierarchy. Further, the feature set creation module 212 may be configured to provide hierarchy of contextual and preprocessed feature sets. For example, a lowest layer in the hierarchy may consist of low-level features closer to the data stream collected from the equipment 104 and a top most layer in the hierarchy may consist of high level, more contextual, abstract and predictive features.

Furthermore, the feature set creation module 212 may be configured to handle missing values and duplicate instances in data received from the characterization module 202, the classification module 204, the insight indices generation module 206 and the service actionable module 208. The missing values may be handled by categorizing results to identify missing and incomplete information as separate result states to produce cleaned dataset readily usable by the AI/ML platforms 222. Also, the duplicate instances may be handled by reusing each of the generated feature set along the hierarchy to avoid any reprocessing that may result in duplication. In addition, the system 200 may be configured to version each feature set generated along with timestamp to enable feature provenance.

The validation module 214 may be configured to validate the feature sets by removing errors present in the generated feature sets by each of the characterization module 202, the classification module 204, the insights indices generation module 206 and the service actionable module 208. For this, the validation module 214 may first check if the feature sets have any errors or not. Further, the validation module 214 may remove redundant feature sets if there is any redundancy found. If the feature sets have errors, then, the validation module 214 may remove such errors for further processing. The validation module 214 may communicate the validated feature sets to the labelling module 216.

The labelling module 216 may be configured to use the validated feature sets as labelled data for previous feature sets in the hierarchy of processing and categorize the labelled data corresponding to contextual and pre-processed feature sets using a plurality of pre-defined and user-configurable attributes. Moreover, each feature set may act as labelled dataset for a previous layer with the ability to dynamically change the definition of the features and the feature sets used with incremental addition and modification of the features available. Therefore, a layered multi loop system may be created and accuracy of a final service actionable objective for each performance objective may be improved by tuning the loops hierarchically resulting in low processing resource requirement of the system 200.

The output of the labelling module 216 may be provided to the feature set library and recommendation engine 218 for various objectives. The feature set library and recommendation engine 218 may be configured to create a library of contextual and preprocessed feature sets in a hierarchical manner. The feature set library and recommendation engine 218 may be configured to recommend feature sets as well as labelled data from the generated feature sets to a user based on a problem statement/hypothesis to be solved as defined by the user. Also, the feature set library and recommendation engine 218 may be further configured to provide feature set recommendations to the user in form of a plurality of categories using one or more dimensions. In an exemplary embodiment, the plurality of categories may comprise technology category and problem and performance category. Also, the problem type may comprise failure prediction, best operation setting forecast and operation settings optimization. Further, the feature set library and recommendation engine 218 may provide recommendations categorized by a problem category to the user using the following dimensions:

a) Component process technology similarity between different equipment;
b) Problem type i.e. failure prediction, forecast of best operation setting, operation settings optimization;
c) Hierarchical and enriched pre-processed feature set by degrees of processing.

Further, the interface 220 may be configured to receive an input from the user of the system 200. The interface 220 enables the user to define the problem statement/hypothesis to be solved in a particular equipment category. In particular, the input from the user may correspond to a problem or hypothesis. Also, the input may be a pre-defined input or the user may specify a new input using the interface 220. In particular, the user may be provided with an option to select a previously solved objective or define a new objective corresponding to an equipment as a hypothesis in a particular equipment category. The user may also select the technology category to use the hierarchical feature sets available from the feature set library and recommendation engine 218 associated with the technology category for same or similar equipment using a similar technology for an operation. The user may also be provided with an option to select the problem type to use the hierarchical feature sets available from the feature set library and recommendation engine 218 associated with the problem type categories for the same or similar equipment with a similar type of the operation or failures and may use additional hierarchy of available related feature sets incrementally in case the user defined objectives are not achieved.

Further, the user is enabled to specify an error margin and a resource limit for the problem statement/hypothesis to be solved. On receiving the input from the user, the feature set library and recommendation engine 218 may identify suitable/optimal feature sets from the feature sets based on the input from the user. Also, the feature set library and recommendation engine 218 may recommend the feature sets to the user within the specified error margin. Then, the feature set library and recommendation engine 218 may recommend the identified feature sets in a hierarchy to the user and the interface 220 may display the recommended feature sets in the hierarchy to the user.

In an exemplary embodiment, the recommended hierarchical feature sets may be presented to the user in form of a plurality of categories such as a technology category, a problem category and a performance category and the like. Such pre-defined categorized feature sets may help the user to identify the hypothesis to be solved and allows the system 200 to group similar problems together and thereby provide better recommendations to the user. For example, heat exchange in a refrigeration system or a chiller system has technology differences but follows basic laws of thermodynamics and thus, are related. Further, heat exchange may also be at multiple sides of an equipment 104 such as water side, refrigerant side etc. thereby, providing a common categorization for heat exchange may allow harmonizing such variances and may add ability to learn from one problem solving model to another. Another example may be a central processing unit (CPU) and memory usage patterns leading to failure for any computerized or microprocessor-based equipment. In addition, all service actionable generated may also be available to the user as suggested hypothesis or problems to be solved and gives a library of already solved problems or hypothesis solved which may be similar to the current equipment category but solved in a different equipment category.

Using the interface 220, the user may receive the generated hierarchical feature set recommendations from the feature set library and recommendation engine 218 based on the defined hypothesis. Then, the user may be enabled to select features, using the interface 220, from the hierarchy of received feature sets for further processing and also enabled to configure a number of iterations with incremental feature sets until an objective is achieved for the defined hypothesis. Further, the user may also be enabled to configure ground truth labels corresponding to the objective or select higher level features in the hierarchy in each generated feature set as weak labels in case of absence of ground truth labels.

The present invention further encompasses the system 200 to create a matrix based on the selected feature set recommendations, the ground truth labels or the weak labels and the user selections of the hypothesis with the error margin for feeding into the AI/ML supervised algorithm(s) 222 to run a process in an iterative manner for solving the particular hypothesis within the specified resource limit. Moreover, the system 200 may be configured to use higher level features in the hierarchy in each generated feature set as weak labels for achieving SACT objectives in case when ground truth labels corresponding to the objective are not available at all or are available only for a subset of instances. The system 200 may further be configured to use weak labels from different hierarchies of feature sets to predict unseen ground truth labels. Also, the weak labels may be labels which are confirmed by automation only and the ground truth labels may be labels which are confirmed through actual successful implementation of recommendation by a technician.

The formed matrix may be fed into the AI/ML model 222 and the AI/ML model 222 may take the recommended feature sets to run a process in iterative loop for solving a particular problem (i.e. input). The iteration may run multiple times to optimize the input defined by the user. The optimizations may run till the desired state with the pre-defined error margin is achieved or a predefined time limit is reached. The system 200 may work as a centralized data store for providing the features and/or labels during training as well as prediction. This would ensure consistency and repeatability need for feeding data in the AI/ML model 222. Also, the value of each feature may be time stamped and version controlled, enabling data/feature provenance. The feature sets may be recommended to the user for running the iterations until the recommendations are within the specified error margin or when the specified resource limit is reached. The system 200 may be configured to recommend the user to use higher order related features to achieve recommendations within the specified error margin and/or when the specified resource limit is reached. Further, the system 200 may be configured to use pre-configured number of iterations and to automatically select features from the hierarchy of received feature sets from the feature set library and recommendation engine 218 based on the hypothesis for further processing thereby making the system 200 completely autonomous to generate the feature set recommendations within the specified error margin.

Furthermore, the feature set library and recommendation engine 218 may recommend most appropriate feature sets and/or labelled dataset to the user for confirming and solving the problem or the hypothesis. The interface 220 displays the recommended feature sets to the user in a hierarchical manner and the user is able to set up and preconfigure iterations with incremental feature sets until an objective for the input is met in a supervised learning-based approach. It is noted that the supervised learning approach is known in the art and is not explained here for brevity. The system 200 iteratively recommends the feature sets to the user for providing a solution to the input provided by the user. Also, each iteration may use combinations of the feature sets as recommended to reduce the processing and discovery requirements in selection of the feature sets and/or label dataset that is part of any successful AI/ML model creation. In an alternative embodiment, the user may allow the system 200 to decide the selection of the feature sets and labelling to be used thereof in a completely autonomous manner in an unsupervised approach.

Also, the feature set library and recommendation engine 218 may provide multiple metadata recommendations to the user. For an instance, metadata recommendations may include, but is not limited to, a set of most discriminative/ high level features based on the domain knowledge, a set of associated lower level features, a set of less significant/less processed/relatively granular/lower level features, a set of weak labels, a set of hard labels, a set of associated hard labels etc. In the supervised approach as explained above, the feature set library and recommendation engine 218 may additionally provide multiple recommendations for the data for each corresponding metadata recommendation to the user based on combination used in a previous iterations for a similar equipment category to achieve desired results. If the user's defined objectives are not achieved, the feature set library and recommendation engine 218 may provide an option to pull-in/use additional hierarchy of available feature sets.

The present invention encompasses the system 200 to create a self-learning layered framework for recommending the feature sets to the user using artificial intelligence (AI) or machine leaning (ML) techniques. Also, the system 200 may allow to select a recommended prioritization method for usage of the feature set and may modify these feature set if necessary. Further, the system 200 may setup the AI/ML model creation process by using the AI/ML model 222 to run iteratively until target accuracy parameters are achieved or constraints on resources usage is crossed. In addition, the system 200 may also allow for dynamically editing and creation of additional/new feature sets in the above-mentioned categories or may also allow to modify current feature sets. Also, the system 200 may allow for editing and creation of additional categories which may be used to setup processing and feature-set usage prioritization by the AI/ML model 222. The present invention further encompasses the system 200 to dynamically update the feature sets based on learnings and collated crowd sourced knowledge within the system 200.

The system 200 may also enable the user to choose different combinations of the feature sets based on the recommendations provided by the feature set library and recommendation engine 218. The users may also have the ability to add feature set/s automatically and incrementally while setting a target objective. Additionally, new feature sets can be created/published using simple configuration files stating the input data source and an extraction logic (metadata). In case of success of the objective, the system 200 may enable the user to request backfilling of the values of new feature sets for historical data enabling additional historical data sets for use by the AI/ML model 222. The AI/ML model 222 may consume the generated feature sets comprising simple canonical names which makes the usage of recommendations of the feature sets from the feature set library and recommendation engine 218 intuitive and easy. This also helps in enablement of an ecosystem for labelling where actions in the field and confirmation of actions may be converted to labels which can be directly fed back to the feature set library and recommendation engine 218 for use without additional processing. End usage of the feature set library and recommendation engine 218 may be to create feature-sets which can be used by the AI/ML model 222 processing stack applying a methodology of 'objective categorization', 'ecosystem learning' and 'simplified in-process application' to transform reactive processes around comfort and efficiency into a proactive process. The objective categorization may involve identifying various objectives for an equipment 104 and creating models for the same. Also, the ecosystem learning may involve creation of labelled dataset signifying a particular objective to predict based on past dataset via an ecosystem which may be directly fed into the label creation aspect of the feature set library and recommendation engine 218. Likewise, the simplified in-process application may involve converting results of the AI/ML model/s into simplified metrics that may be easily interpreted and verified thereby improving the existing process to make the system 200 more user friendly.

Various embodiments of the present invention provide technical advantage of offering out of box features considered as domain-based heuristics and site additional features on top of these out of the box features on need basis. Various embodiments of the present invention provide technical advantage of providing a deep, multi-layered data architecture where knowledge is shared across levels through hierarchy of contextual and preprocessed feature sets.

Figure 3:
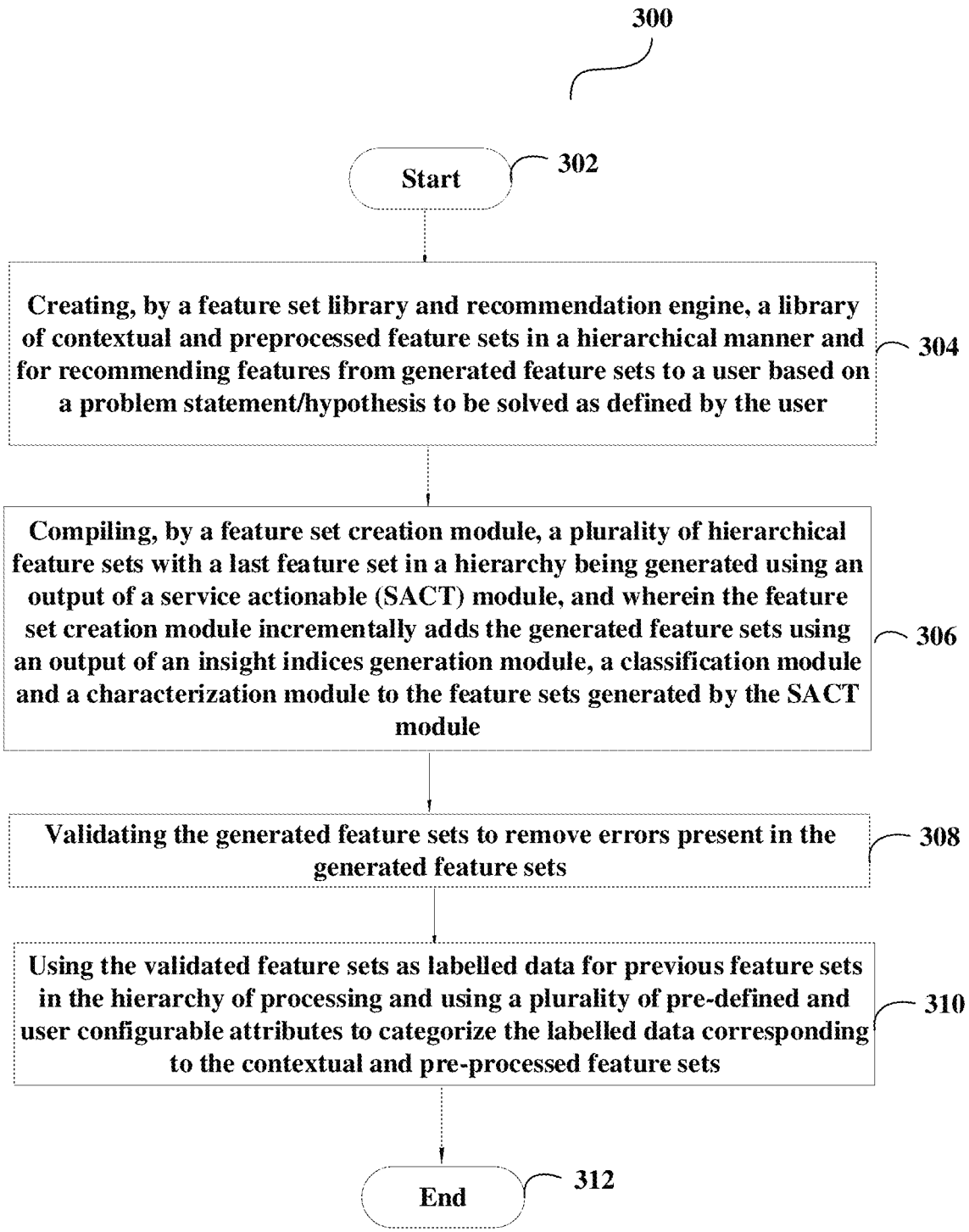
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method for recommendation and reengineering of feature sets and labelled data for an equipment 104. The method flowchart 300 starts at step 302.

At step 304, a system 200 may create, by a feature set library and feature set library and recommendation engine 218, a library of contextual and preprocessed feature sets in a hierarchical manner and for recommending features from generated feature sets to a user based on a problem statement/hypothesis to be solved as defined by the user. This has been explained in detail in FIG. 2 above.

At step 306, the system 200 may compile, by a feature set creation module 212, a plurality of hierarchical feature sets with a last feature set in a hierarchy being generated using an output of a service actionable (SACT) module 208. Also, the feature set creation module 212 may incrementally add the generated feature sets using an output of an insight indices generation module 206, a classification module 204 and a characterization module 202 to the feature sets generated by the SACT module 208. This has been explained in detail in FIG. 2 above.

At step 308, the system 200 may validate the generated feature sets to remove errors present in the generated feature sets. This has been explained in detail in FIG. 2 above.

At step 310, the system 200 may use the validated feature sets as labelled data for previous feature sets in the hierarchy of processing and using a plurality of pre-defined and user configurable attributes to categorize the labelled data corresponding to the contextual and pre-processed feature sets. This has been explained in detail in FIG. 2 above. Then, the method flowchart 300 may end at 312.

Figure 4A:
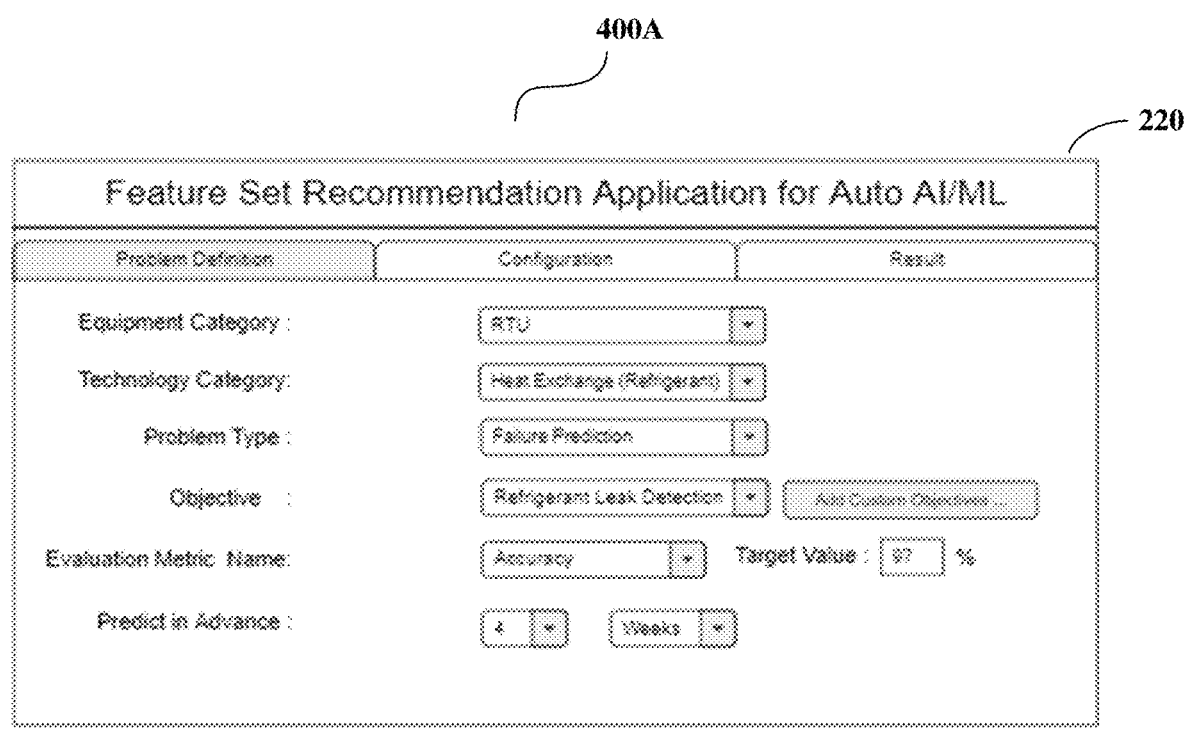

FIG. 4A depicts a screenshot 400A of an interface 220 of the system 200 showing a "Problem Definition" tab to define a problem statement. In this example and as can be seen in the screenshot 400A, the user has selected "RTU" i.e. Roof-top unit as an input for "Equipment Category" option and has also selected "Heat Exchange (Refrigerant)" as "Technology Category" option. Further, "Failure Prediction" has been selected by the user as "Problem Type" option and "Refrigerant Leak Detection" has been selected by the user as "Objective" option. Moreover, the user may choose "Accuracy" as "Evaluation metric Name" and has selected "4 weeks" as targeted "Predict in Advance".

Figure 4B:
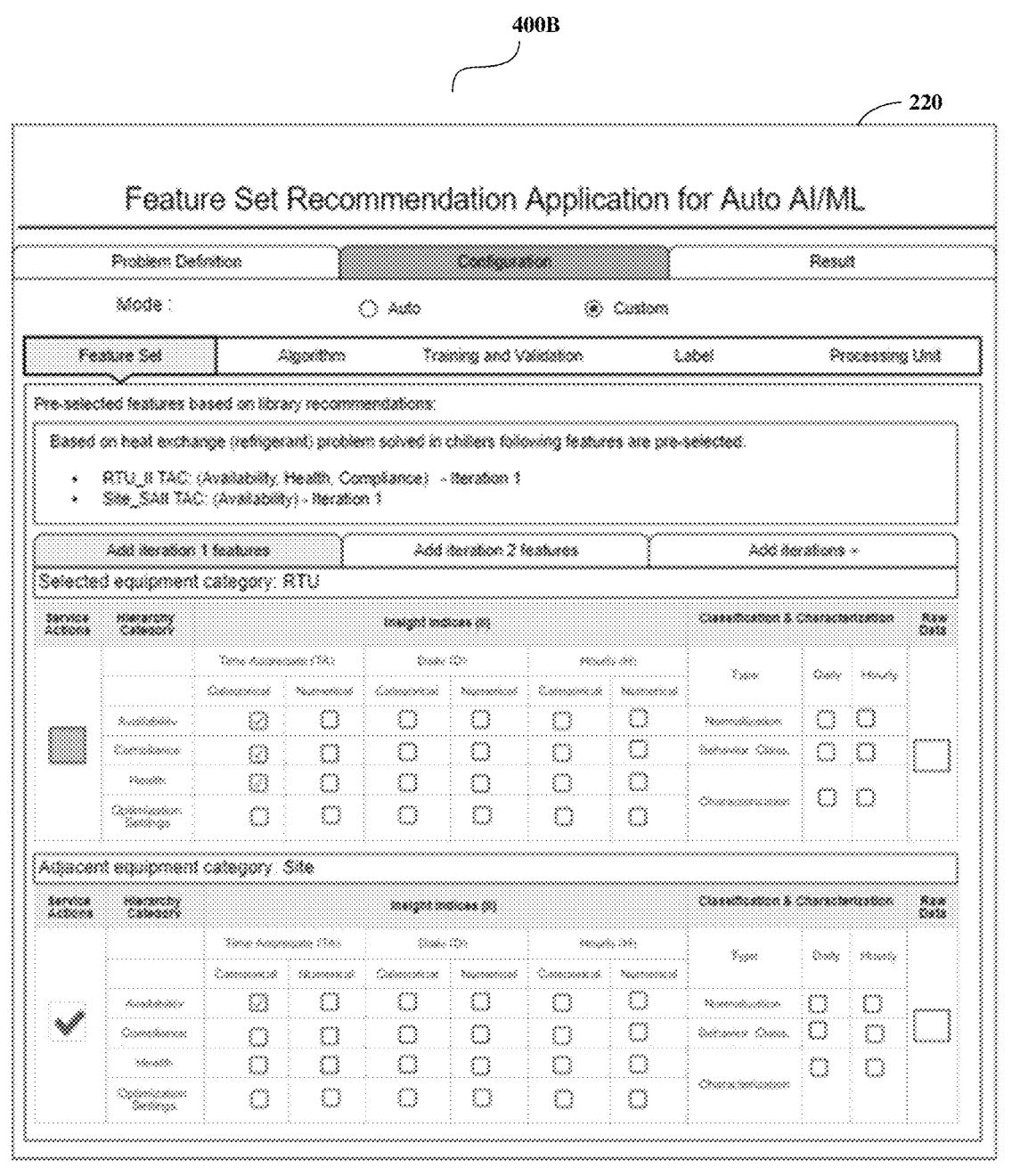

FIG. 4B depicts a screenshot 400B of an interface 220 of the system 200 showing selection of "Feature Set" tab under a "Configuration" tab. In the "Configuration" tab, there are two modes available (a) Auto Mode and (b) Custom Mode. In Auto Mode, the system 200 may automatically configure all options provided in the "Configuration" tab and in Custom mode, the user may customize the options provided by the system in auto-mode further as per his/her requirement. In this example and as can be seen in the screenshot 400B, the user has opted for custom mode. Also can be seen other tabs such as "Feature Set" tab, "Algorithm" tab, "Training and Validation" tab, "Label" tab, and "Processing Unit" tab.

In the screenshot 400B, the user has selected the Feature Set" tab and under this tab, the system 200 may pre-select features (such as a) RTU_II TAC (Availability, Health, Compliance)—Iteration 1 and b) Site_SAII: (Availability)—Iteration 1) based on library recommendations by the feature set library and recommendation engine 218. i.e. for the example problem definition of the equipment category RTU, the pre-selected feature sets are time aggregated (TA) categorical (C) insight indices (II) of type Availability, Health and Compliance and additional feature sets service actions (SA), time aggregated (TA) categorical (C) insight indices (II) of type Availability from associated equipment category site are selected for iteration 1.

Figures 4C, 4D:
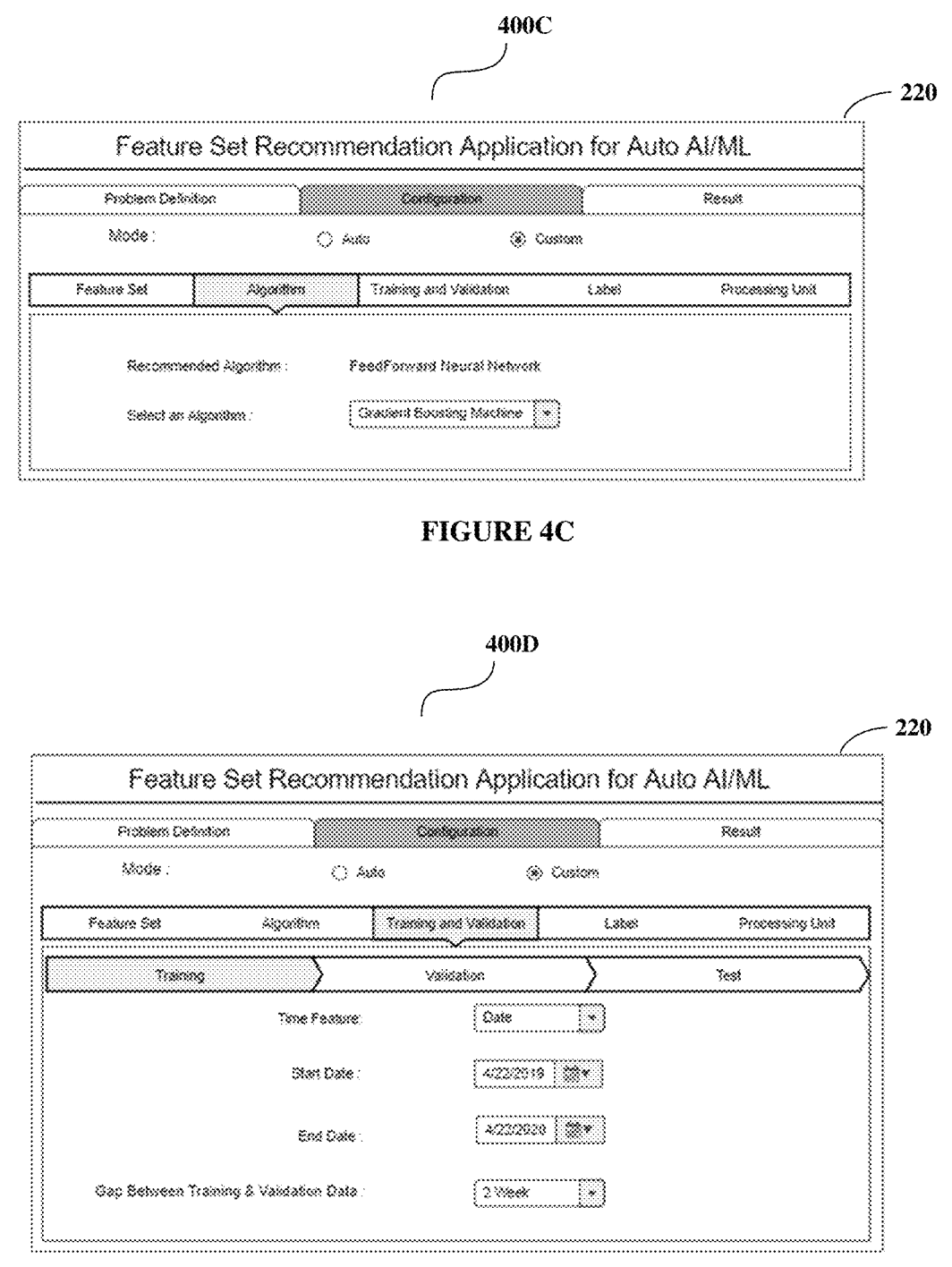

FIG. 4C depicts a screenshot 400C of an interface 220 of the system 200 showing selection of "Algorithm" tab under the "Configuration" tab. As can be seen in the screenshot 400C, the user has selected "Feed Forward Neural Network" as an input for "Recommended Algorithm" option and has also selected "Gradient Boosting Machine" as an input for "Select an Algorithm" option.

FIG. 4D depicts a screenshot 400D of an interface 220 of the system 200 showing selection of "Training and Validation" tab under the "Configuration" tab. As can be seen in the screenshot 400D, the user has selected "4/22/2019" as the Start date and 4/22/2020 as the End date. The user has also selected "2 weeks" as an input for "Gap Between Training and Validation Data" option.

Figure 4E:
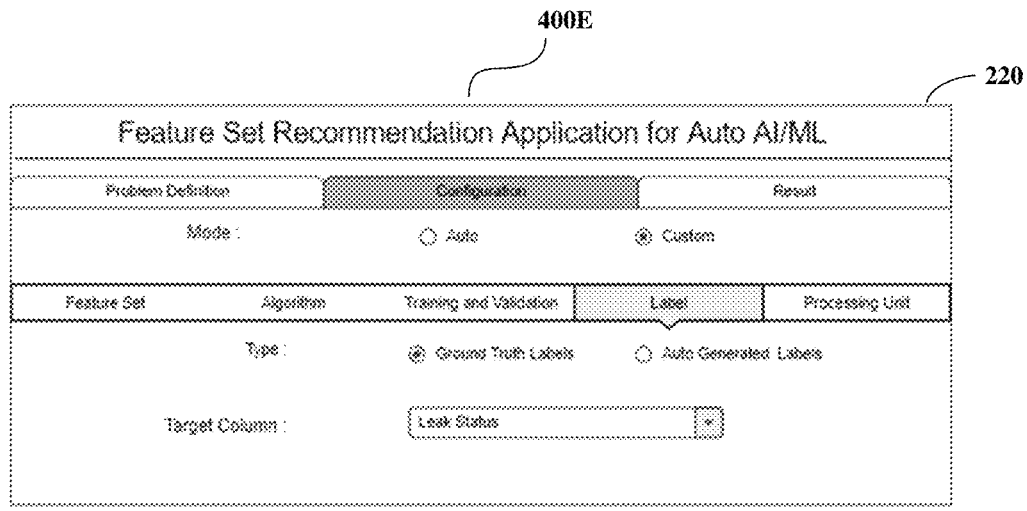

FIG. 4E depicts a screenshot 400E of an interface 220 of the system 200 showing selection of "Label" tab under the "Configuration" tab. As can be seen in the screenshot 400E, the user has selected "Ground Truth Labels" as an input for "Type" option. The user has also selected "Leak Status" as an input for "Target Column" option.

Figure 4F:
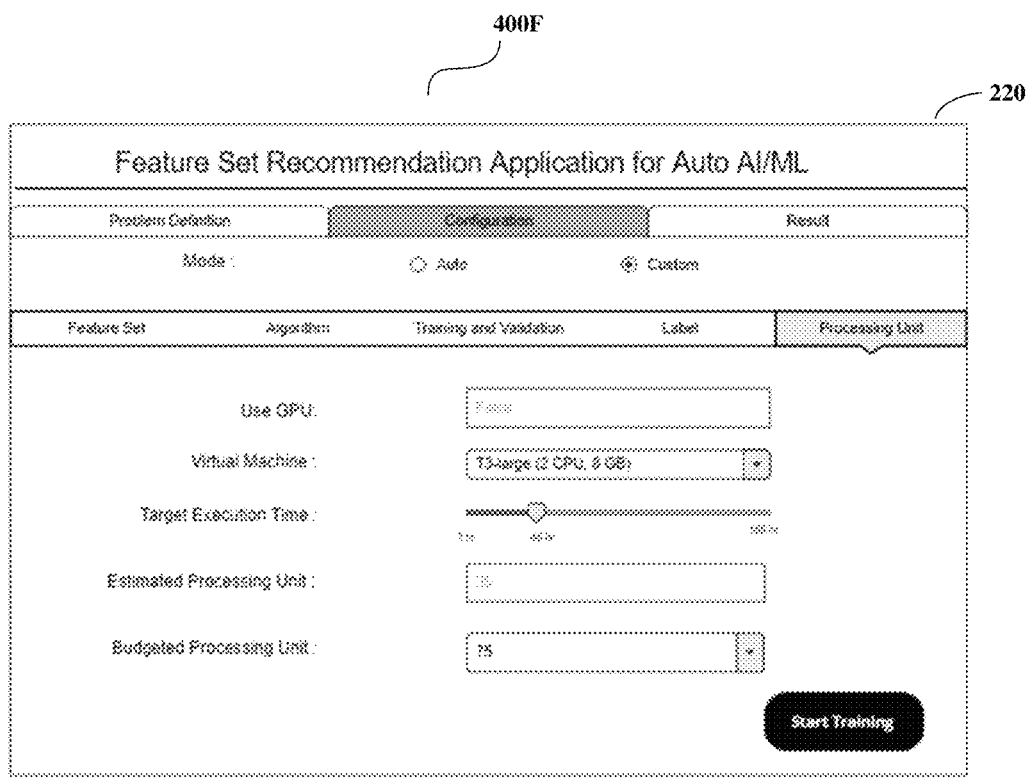

FIG. 4F depicts a screenshot 400F of an interface 220 of the system 200 showing selection of "Processing Unit" tab under the "Configuration" tab. As can be seen in the screenshot 400F, the user has selected "T3-large (2 CPU, 8 GB)" as an input for "Virtual Machine" option. The user has also opted for 48 hours for "Target Execution Time" option and has also selected "75" as an input for "Budgeted Processing Unit" option. Then, the user may select "Start Training" option for starting the training.

The purpose of this interface 220 is to the provide user with an estimate of processing units required for going through the iterations of the feature sets in the previous FIG. 4B based on his/her selection of the compute resources and a targeted execution time. The system 200 uses the selected feature sets (automated or custom) and runs through a training process with the defined target accuracy objectives and the budgeted processing units.

Figure 4G:
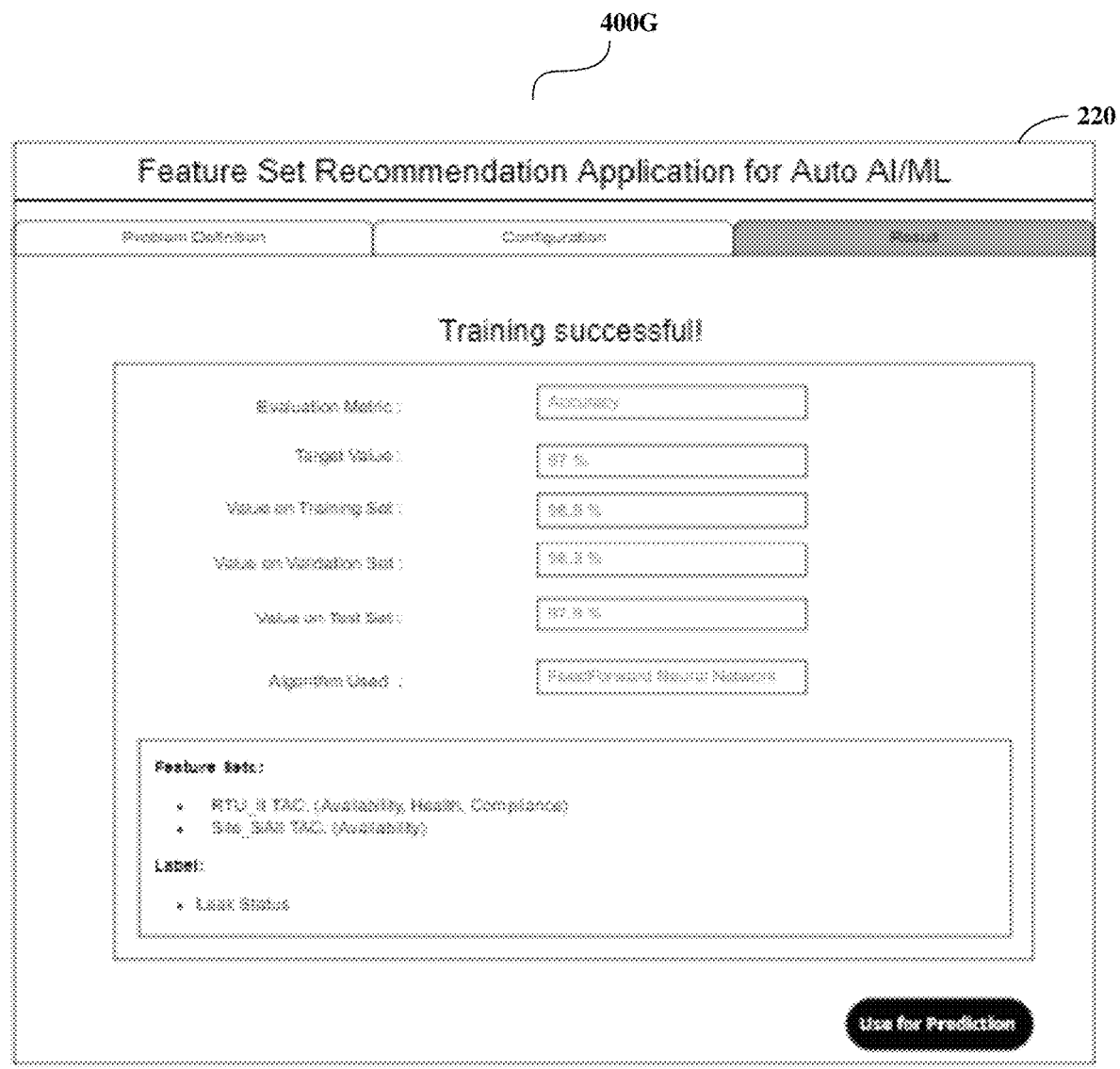

FIG. 4G depicts a screenshot 400G of an interface 220 of the system 200 showing selection of "Result" tab. In this screenshot 400G, the message "Training Successful" is displayed along with "Accuracy" for "Evaluation Metric" option, "97%" for "Target Value" option, "98.9" for "Value on Training Set" option, "98.3%" for "Value on Validation Set" option, and "97.9%" for "Value on Test Set" option with "Feed Forward Neural Network" selected as "Algorithm used". Also, can be seen "Feature Sets" shown as a) RTU_II TAC (Availability, Health, Compliance) and b) Site_SAII: (Availability). Moreover, the "Label" is shown as "Leak Status".

The system 200 hence interacts with an auto AI/ML system helping the user to choose the right feature set combinations, algorithms and running the process interactively to arrive at a model in the auto AI/ML system with most optimum resource usage in the training and testing process.

The present invention is applicable in any industry/field that is well known in the art and where an equipment is utilized. The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a system 200 for recommendation and reengineering of feature sets and labelled data for an equipment 104. A computer readable medium comprises one or more processors and a memory coupled to the one or more processors, the memory stores instructions executed by the one or more processors. The one or more processors are configured to create, by a feature set library and recommendation engine 218, a library of contextual and preprocessed feature sets in a hierarchical manner and for recommending features from generated feature sets to a user based on a problem statement/hypothesis to be solved as defined by the user. The one or more processors are configured to compile, by a feature set creation module 212, a plurality of hierarchical feature sets with a last feature set in a hierarchy being generated using an output of a service actionable (SACT) module 208. The feature set creation module 212 incrementally adds the generated feature sets using an output of an insight indices generation module 206, a classification module 204 and a characterization module 202 to the feature sets generated by the SACT module 208. The one or more processors are configured to validate the generated feature sets to remove errors present in the generated feature sets and using the validated feature sets as labelled data for previous feature sets in the hierarchy of processing and to use a plurality of pre-defined and user configurable attributes to categorize the labelled data corresponding to the contextual and pre-processed feature sets.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for recommendation and reengineering of feature sets and labelled data for an equipment, the system comprising:
   a feature set library and recommendation engine configured to create a library of contextual and preprocessed feature sets in a hierarchical manner and to recommend features from generated feature sets to a user based on a problem statement/hypothesis to be solved as defined by the user;
   a feature set creation module configured to compile a plurality of hierarchical feature sets with a last feature set in a hierarchy being generated using an output of a service actionable (SACT) module, and wherein the feature set creation module is further configured to incrementally add the generated feature sets using an output of an insight indices generation module, a classification module and a characterization module to the feature sets generated by the SACT module;
   a validation module configured to validate the generated feature sets to remove errors present in the generated feature sets; and
   a labelling module configured to use the validated feature sets as labelled data for previous feature sets in the hierarchy of processing and using a plurality of predefined and user-configurable attributes to categorize the labelled data corresponding to the contextual and pre-processed feature sets.

2. The system of claim 1, wherein the recommended feature sets and the labelled data for the equipment are used by Artificial Intelligence (AI), Machine Learning (ML), Auto-AI platforms using a library of reusable, modelled, hierarchical features.

3. The system of claim 1, wherein the feature set library and recommendation engine is further configured to provide the feature set recommendations to the user in form of a plurality of categories using one or more dimensions, wherein the plurality of categories comprise technology category and problem and performance category, wherein the one or more dimensions comprise component process technology similarity between different equipment, problem type and hierarchical and enriched pre-processed feature set by degrees of processing, and wherein the problem type comprises failure prediction, best operation setting forecast and operation settings optimization.

4. The system of claim 1, wherein the generated feature sets comprise a plurality of numerical and categorical feature sets.

5. The system of claim 1, wherein the system is configured to use higher level features in the hierarchy in each of the generated feature set as weak labels for achieving SACT objectives in case when ground truth labels corresponding to an objective are not available or are available only for a subset of instances, and wherein the system is further configured to use weak labels from different hierarchies of the generated feature sets to predict unseen ground truth labels, and wherein the weak labels are labels which are confirmed by automation only and the ground truth labels are labels which are confirmed through actual successful implementation of recommendation by a technician.

6. The system of claim 1, wherein the user is enabled to interact with the system using a well-defined interface, and wherein the interface enables the user to:
   define the problem statement/hypothesis to be solved in a particular equipment category;
   specify an error margin and a resource limit for the problem statement/hypothesis to be solved;
   receive the generated hierarchical feature set recommendations from the feature set library and recommendation engine based on the defined hypothesis;
   select features from the hierarchy of received feature sets for further processing; and
   configure a number of iterations with incremental feature sets until an objective is achieved for the defined hypothesis; and
   configure ground truth labels corresponding to the objective or select higher level features in the hierarchy in each generated feature set as weak labels in case of absence of ground truth labels;
   wherein the system is configured to create a matrix based on the selected feature set recommendations, the ground truth labels or the weak labels and user selections of the hypothesis with the error margin for feeding into an AI/ML supervised algorithm(s) to run a process in an iterative manner for solving the particular hypothesis within the specified resource limit, and wherein the feature sets are recommended to the user for running the iterations until the recommendations are within the specified error margin or when the specified resource limit is reached, and wherein the system is configured to recommend the user to use higher order related features in hierarchy to achieve recommendations within the specified error margin when the specified resource limit is reached.

7. The system of claim 6, wherein the system is configured to use pre-configured number of iterations and to automatically select features from the hierarchy of the received feature sets from the feature set library and recommendation engine based on the hypothesis for further processing thereby making the system completely autonomous to generate the feature set recommendations within the specified error margin.

8. The system of claim 3, wherein the system is configured to provide the user with an option to:
   select a previously solved objective or define a new objective corresponding to an equipment as a hypothesis in a particular equipment category;

select the technology category to use the hierarchical feature sets available from the feature set library and recommendation engine associated with the technology category for same or similar equipment using a similar technology for an operation; and select the problem type to use the hierarchical feature sets available from the feature set library and recommendation engine associated with the problem type categories for the same or similar equipment with a similar type of the operation or failures; and use additional hierarchy of available related feature sets incrementally in case the user defined objectives are not achieved.

9. The system of claim 1, wherein the output from the characterization module is a numerical feature set of characterized data that addresses a plurality of variances owing to differences in technology, frequency, asynchronicity, data stream interruptions, make and model in data stream received from the equipment by uniformly characterizing equipment type reusable by other systems to determine equipment behavior.

10. The system of claim 1, wherein the output from the classification module is a categorical feature set of time-granular normalized characteristics after behaviorally classifying and profiling the equipment under different categories at individual time intervals to proactively resolve behaviors associated with the equipment which can otherwise lead to a failure or inefficient operations.

11. The system of claim 1, wherein the output from the insight indices generation module is a numerical and categorical feature set of insight indicators at a time granular level independent of plurality of characteristics and behavior for the equipment after normalizing variances of characteristics and behavior over a time duration.

12. The system of claim 1, wherein the output from the service actionable module is a categorical feature set of service actionable which can be integrated into workflows obtained after categorizing, hierarchically correlating and aggregating insight indices over a period of its result state.

13. The system of claim 1, wherein the feature set creation module is configured to handle missing values and duplicate instances in data received from the characterization module, the classification module, the insight indices generation module and the service actionable (SACT) module, and wherein the missing values are handled by categorizing results to identify missing and incomplete information as separate result states to produce cleaned dataset readily usable by AI/ML platforms, and wherein the duplicate instances are handled by reusing the each generated feature set along the hierarchy to avoid any reprocessing that may result in duplication, and wherein the system is configured to version each feature set generated along with a timestamp to enable feature provenance.

14. The system of claim 1, wherein the system is configured to create/publish new feature sets using simple configuration files stating an input data source and extraction logic (metadata), and wherein the system is further configured to enable the user to request backfilling of values of new feature sets for historical data enabling additional historical data sets for use by AI/ML platforms.

15. The system of claim 14, wherein the generated feature sets comprise a plurality of simple canonical names directly available for consumption by the AI/ML platform to make the usage of the recommendations from the feature set library and recommendation engine intuitive and easy.

16. The system of claim 1, wherein the system is configured to convert actions in a field and confirmation of the actions into labels which are directly fed back to the feature set library and recommendation engine for use without any additional processing.

17. A method for recommendation and reengineering of feature sets and labelled data for an equipment, the method comprising:

creating, by a feature set library and recommendation engine, a library of contextual and preprocessed feature sets in a hierarchical manner and for recommending features from generated feature sets to a user based on a problem statement/hypothesis to be solved as defined by the user;

compiling, by a feature set creation module, a plurality of hierarchical feature sets with a last feature set in a hierarchy being generated using an output of a service actionable (SACT) module, and wherein the feature set creation module incrementally adds the generated feature sets using an output of an insight indices generation module, a classification module and a characterization module to the feature sets generated by the SACT module;

validating the generated feature sets to remove errors present in the generated feature sets; and using the validated feature sets as labelled data for previous feature sets in the hierarchy of processing and using a plurality of pre-defined and user-configurable attributes to categorize the labelled data corresponding to the contextual and pre-processed feature sets.

18. The method of claim 17, wherein the recommended feature sets and labelled data for the equipment are used by Artificial Intelligence (AI), Machine Learning (ML), Auto-AI platforms using a library of reusable, modelled, hierarchical features.

19. The method of claim 17, wherein the feature set library and recommendation engine provides feature set recommendations to the user in form of a plurality of categories using one or more dimensions, and wherein the plurality of categories comprise technology category and problem and performance category, and wherein the one or more dimensions comprise component process technology similarity between different equipment, problem type and hierarchical and enriched pre-processed feature set by degrees of processing, and wherein the problem type comprises failure prediction, best operation setting forecast and operation settings optimization.

20. A computer readable medium comprising one or more processors and a memory coupled to the one or more processors, the memory storing instructions executed by the one or more processors, the one or more processors configured to:

create, by a feature set library and recommendation engine, a library of contextual and preprocessed feature sets in a hierarchical manner and for recommending features from generated feature sets to a user based on a problem statement/hypothesis to be solved as defined by the user;

compile, by a feature set creation module, a plurality of hierarchical feature sets with a last feature set in a hierarchy being generated using an output of a service actionable (SACT) module, and wherein the feature set creation module incrementally adds the generated feature sets using an output of an insight indices generation module, a classification module and a characterization module to the feature sets generated by the SACT module;

validate the generated feature sets to remove errors present in the generated feature sets; and use the validated feature sets as labelled data for previous feature sets in the hierarchy of processing and using a plurality of pre-defined and user-configurable attributes to categorize the labelled data corresponding to the contextual and pre-processed feature sets.

* * * * *